United States Patent
McGowan et al.

(10) Patent No.: US 8,563,083 B2
(45) Date of Patent: Oct. 22, 2013

(54) METHODS OF USE OF CALCIUM HEXA ALUMINATE REFRACTORY LININGS AND/OR CHEMICAL BARRIERS IN HIGH ALKALI OR ALKALINE ENVIRONMENTS

(75) Inventors: Kenneth A. McGowan, Harrison City, PA (US); Robert M. Cullen, Bethel Park, PA (US); James R. Keiser, Oak Ridge, TN (US); James G. Hemrick, Knoxville, TN (US); Roberta A. Meisner, Knoxville, TN (US)

(73) Assignee: Westmoreland Advanced Materials, Inc., Monessen, PA (US)

( * ) Notice: Subject to any disclaimer, the term of this patent is extended or adjusted under 35 U.S.C. 154(b) by 281 days.

(21) Appl. No.: 11/901,909

(22) Filed: Sep. 19, 2007

(65) Prior Publication Data
US 2008/0175990 A1 Jul. 24, 2008

Related U.S. Application Data

(60) Provisional application No. 60/846,171, filed on Sep. 21, 2006.

(51) Int. Cl.
B05D 7/22 (2006.01)
(52) U.S. Cl.
USPC ......................................................... 427/230
(58) Field of Classification Search
USPC ......................................................... 427/230
See application file for complete search history.

(56) References Cited

U.S. PATENT DOCUMENTS

| | | | |
|---|---|---|---|
| 3,944,426 A | 3/1976 | Nickelsen et al. | |
| 4,162,923 A | 7/1979 | Schmitt et al. | |
| 4,682,985 A * | 7/1987 | Kohl | 48/197 R |
| 4,798,628 A | 1/1989 | Mills et al. | |

(Continued)

FOREIGN PATENT DOCUMENTS

| | | |
|---|---|---|
| CN | 1546409 | 11/2004 |
| DE | 3020896 | 12/1981 |

(Continued)

OTHER PUBLICATIONS

Kopanda et al. (Aluminum Company of America) "Production Processes, Properties, and Applications for Calcium Aluminate Cements", Alumina, 1990.

(Continued)

Primary Examiner — Michael Cleveland
Assistant Examiner — Tabatha Penny
(74) Attorney, Agent, or Firm — Buchanan Ingersoll & Rooney PC; Craig G. Cochenour

(57) ABSTRACT

A method for improving the insulating character/and or penetration resistance of a liner in contact with at least one of an alkali and/or alkaline environments is provided. The method comprises lining a surface that is subject to wear by an alkali environment and/or an alkaline environment with a refractory composition comprising a refractory aggregate consisting essentially of a calcium hexa aluminate clinker having the formula $CA_6$, wherein C is equal to calcium oxide, wherein A is equal to aluminum oxide, and wherein the hexa aluminate clinker has from zero to less than about fifty weight percent $C_{12}A_7$, and wherein greater than 98 weight percent of the calcium hexa aluminate clinker having a particle size ranging from −20 microns to +3 millimeters, for forming a liner of the surface. This method improves the insulating character/and or penetration resistance of the liner.

12 Claims, 1 Drawing Sheet

(56) References Cited

U.S. PATENT DOCUMENTS

| | | | |
|---|---|---|---|
| 4,946,505 A | 8/1990 | Jungk | |
| 4,963,395 A * | 10/1990 | Lewis et al. | 427/253 |
| 5,071,484 A | 12/1991 | Bonifay et al. | |
| 5,108,510 A | 4/1992 | Burge et al. | |
| 5,356,472 A | 10/1994 | Odler | |
| 5,744,413 A * | 4/1998 | Cortellini | 501/128 |
| 5,851,282 A | 12/1998 | Odler | |
| 6,730,159 B1 | 5/2004 | Falaschi et al. | |
| 2003/0024806 A1 | 2/2003 | Foret | |
| 2005/0049138 A1* | 3/2005 | McGowan | 501/125 |
| 2006/0266268 A1 | 11/2006 | Klishchat | |

FOREIGN PATENT DOCUMENTS

| | | |
|---|---|---|
| EP | 1178023 A1 | 2/2002 |
| JP | 06115986 | 4/1994 |
| JP | 2004299972 | 10/2004 |
| WO | 01/90030 A1 | 11/2001 |

OTHER PUBLICATIONS

Chemical Science and Technology Handbook, Am. Ceram. Sci., pp. 171-183 (1990).

International Search Report for PCT/US2007/020288 dated Feb. 27, 2008.

Written Opinion of the International Searching Authority for PCT/US2007/020288 dated Feb. 27, 2008 (Form PCT/ISA/237).

International Preliminary Report on Patentability for PCT/US2007/020288 dated Oct. 7, 2008 (Form PCT/IPEA/409).

Supplementary European Search Report for Application No. EP 07 83 8492 dated Jun. 10, 2011.

Buhr et al., "Raw Material Concepts for SiO2 Free High Strength and Low Wettability Aluminum Castables", 9th Biennial Worldwide Congress on Refractories, Nov. 8, 2005, pp. 635-641, XP008137740.

Stigsson, "CHEMREC™" Black Liquor Gasification, 1998 International Chemical Recovery Conference Proceedings, pp. 663-674.

* cited by examiner

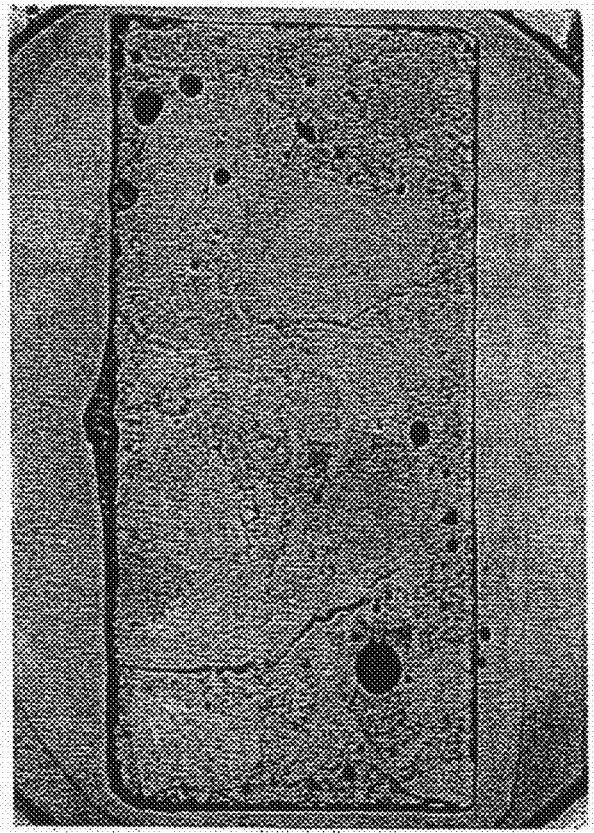
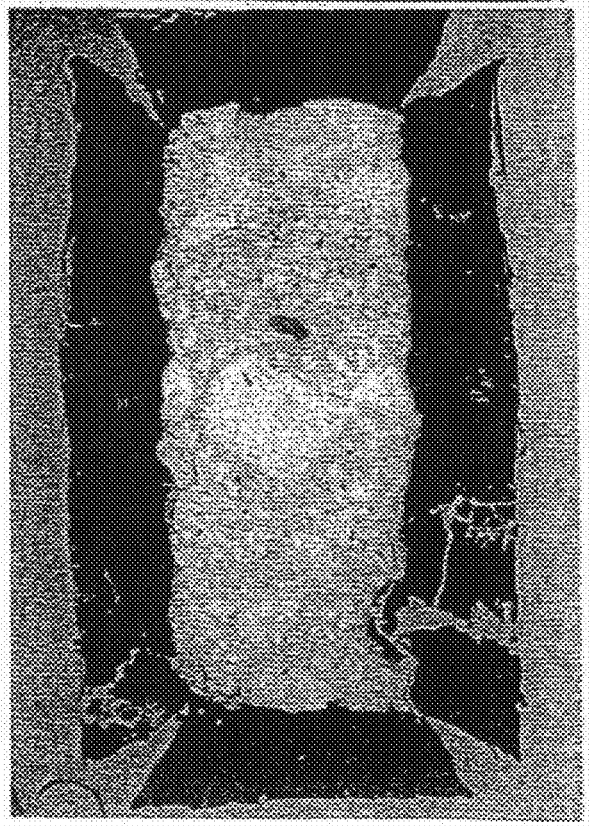

US 8,563,083 B2

METHODS OF USE OF CALCIUM HEXA ALUMINATE REFRACTORY LININGS AND/OR CHEMICAL BARRIERS IN HIGH ALKALI OR ALKALINE ENVIRONMENTS

CROSS-REFERENCE TO RELATED APPLICATION

This utility patent application claims the benefit of co-pending U.S. Provisional Patent Application Ser. No. 60/846,171, filed on Sep. 21, 2006. The entire contents of U.S. Provisional Patent Application Ser. No. 60/846,171 is incorporated by reference into this utility patent application as if fully written herein.

STATEMENT REGARDING FEDERALLY SPONSORED RESEARCH

Certain embodiments of this invention were made with Government support in conjunction with Oak Ridge National Laboratory under contract CEED 001 and ED1904032 awarded by the Department of Energy. The Government may have certain rights in the invention.

BACKGROUND OF THE INVENTION

1. Field of the Invention

The use of Calcium (Hexa)Aluminate as an aggregate in shapes and castables for use as a chemical barrier and/or a refractory for high alkali/alkaline environments. The present invention provides a method of using an improved aggregate based on $CaO.6(Al_2O_3)$ (hereinafter referred to as calcium hexa aluminate, "CA6", or "$CA_6$", all of which are interchangeable and equivalent terms as used herein) and analogs or derivatives thereof including those based on barium substitution for calcium or barium additions resulting in calcium substitution after chemical reaction and/or heat treatment, all of which are referred to herein as CA6. Methods of using the chemical barriers and/or refractory materials based on aggregate compositions having these phases singularly or combined are provided in the present invention.

2. Description of the Background Art

U.S. Patent Application Publication No. U.S. 2005/0049138 A1 (Publication Date Mar. 3, 2005) entitled "Calcium Aluminate Clinker as a Refractory Aggregate With and Without Barium Addition and Use Thereof" teaches an improved refractory aggregate composition based on $CaO.Al_2O_3$ clinker (hereinafter referred to as "CA" clinker and designated by the following equation $C_nA_x$, wherein n is an integer from about 1 to 12 and x is an integer from about 1-24, and wherein the clinker has from zero to less than 50 weight percent C12A7, and wherein greater than 98 weight percent of the clinker has a particle size ranging from 325 mesh (45 microns) to +10 mesh (+2 mm)) and $C_nA_x$ hydrate phases and analogs or derivatives thereof including those based on barium substitution for calcium or barium additions resulting in calcium substitution after chemical reaction and/or heat treatment, all of which are referred to herein as CA clinker. Methods of using refractory materials or chemical barriers based on aggregate compositions having these phases singularly or combined, and exclusive of $C_{12}A_7$ as a major phase, are provided. More specifically, this art discloses a refractory composition comprising a refractory aggregate consisting essentially of $CA_6$ and a method for improving the insulating character and/or penetration resistance of a liner in contact with molten aluminum in the aluminum industry.

J. E. Kopanda and G. MacZura, Aluminum Company of America, "Production Processes, Properties, and Applications for Calcium Aluminate Cements", Alumina Chemical Science and Technology Handbook, Am. Ceramic Sci., pages 171-183 (1990), describes the historical development of calcium aluminate cements, the raw materials used in the manufacturing process, and the chemical and physical properties, and the hydration/dehydration reactions associated therewith.

An area not discussed in the background art is a method of using a composition comprising CA6 as a refractory aggregate or chemical barrier in high alkali or high alkaline environments.

SUMMARY OF THE INVENTION

The present invention provides a method of using a Calcium (Hexa)Aluminate (CA6, or $CA_6$) composition as an aggregate in shapes and castables for use as a chemical barrier and/or a refractory for high alkali/alkaline environments. Ideally CA6 will be present as the only mineral phase in the barrier/refractory. However, it is known by those skilled in the art that particular particle size distributions are required to achieve the appropriate rheology for a given application. In the case of monolithic materials, bonding phases such as calcium aluminate cements, phenolic resins, organic polymers, and hydratable alumina are required to hold the aggregate in a defined shape or structure. In the case of some preformed shapes, such as pressed shapes, a bonding phase is not required but final strength is typically imparted to the shape by firing the shape to an elevated temperature which results in bonding between the compositional matrix. This is often referred to as ceramic bonding or direct bonding or sintering. In both cases materials other than CA6 may be used to satisfy these needs with little effect on the ability of the material to resist chemical attack or act as a refractory material. Examples of acceptable materials are reactive aluminas, calcined aluminas, tabular aluminas, bubble alumina, zirconates, zirconia, spinels (including magnesium-aluminate) or combinations thereof, provided the sum weight percent of the combinations does not exceed 50% (wt.). Preferably, calcium aluminate cement may be present up to 20% (wt.).

BRIEF DESCRIPTION OF THE DRAWINGS

FIG. 1 shows a typical mullite based refractory composition on the left and a CA6 based refractory composition on the right. Both samples were exposed to molten alkali salts at 1000° C. The mullite material was exposed for a period of 50 hours while the CA6 based composition was exposed for 100 hours. FIG. 1 shows the erosion of the surface of the mullite sample. The tested mullite sample erosion is apparent in examining the edges of the sample which have reacted extensively.

DETAILED DESCRIPTION OF THE INVENTION

The present invention provides a method of lining a surface of a vessel, storage equipment, process equipment, or transport equipment employed in a manufacturing process. The vessel may be any type known in the art that is capable of holding or containing a material such as for example, but not limited to, a boiler, a gasifier, a lime kiln, a cement kiln, a roasting kiln, a fluidized bed reactor, The vessel may be open or close ended with any number of sides and shapes. Storage, process and transport equipment may also be vessels or equipment whose surface needs to be protected from temperature and/or chemical environments. Examples would be burners, rolls, coolers, boiler tubes, ash hoppers, super heaters, steam headers, pipes, and tube sheets.

An area of application for the CA6 composition is in contact with high alkali and/or high alkaline salts or salt forming compounds. In the present application, the term "high" means that a combined percentage of alkali material and alkaline material, if present, exceeds about three percent of the total process mix. Examples of these salts and compounds are potassium hydroxide, potassium carbonate, sodium hydroxide, sodium carbonate, lime, limestone, magnesium hydroxide, magnesium carbonate, potassium phosphate and sodium aluminate, to name a few. These examples are only a small fraction of the possible salts and compounds where CA6 will have application as a refractory and/or chemical lining and is not meant as an exhaustive list of potential contact materials. The alkali/alkaline environment becomes more reactive with increasing temperature. CA6 aggregate is effective as both a chemical barrier and a refractory with a melting point of approximately 1830° C.

The refractory aggregate employed in the method of the present invention is consisting essentially of a calcium aluminate clinker having the formula $CA_6$, wherein C is equal to calcium oxide, wherein A is equal to aluminum oxide, wherein n is the integer 1, wherein x is the integer 6, and wherein preferably the calium aluminate clinker has from zero to less than about fifty weight percent $C_{12}A_7$, and wherein greater than about 98 weight percent of the calcium aluminate clinker has a particle size ranging from −20 microns (u) to +3 millimeters (mm). In another embodiment of the method of this invention, as described herein, the calcium aluminate clinker has a particle size ranging from 325 mesh to +10 mesh.

Another embodiment of the method of this invention provides the $CA_6$ clinker composition as described herein and wherein the composition further includes the addition of a source of barium (added in a variety of forms such as the carbonate or sulfate salts). If the barium exists in the proper ratio with the CaO(C) and the $Al_2O_3$ (A) one can form $BA_6$ (where B=BaO) with temperature. This is an analog of $CA_6$. While BaO is set forth here, those persons skilled in the art shall appreciate that the source of barium may be in several different forms, such as for example but not limited to, barium oxide, barium carbonate or barium sulfate. This is significantly different than the heterogeneous mixtures current technologies have with barium sulfate additions. In a preferred embodiment of the method of this invention, the addition of barium to the compositions of the present invention or the substitution of barium for calcium in the compositions of the present invention, improves the enhanced properties even further by reacting to form analogs of the CA6. U.S. Patent Application Publication No. U.S. 2005/0049138 A1 sets forth several phase diagrams that show compositions having $Al_2O_3$ contents of greater than 68% with the presence of BaO that the Ba can exist in three different forms at 1400 degrees Centigrade. Thus, it will be appreciated the method of the present invention includes the compositions as described herein comprising the addition of BaO or the substitution of BaO in the CA6 clinker for use as an aggregate.

The calcium aluminate CA6 clinker employed in the method of the present invention as described herein is a viable aggregate (as compared to a bond matrix) for refractory products. The clinker may comprise all of the aggregate or a portion thereof. This does not include the use of the compound as a discrete bonding matrix such as cement, where it is currently used in a variety of materials. The $CA_6$ clinker is composed of $CA_6$, and unreacted CaO and $Al_2O_3$ phases. It will be appreciated by those persons skilled in the art that commercially available clinker have several impurities present such as for example various iron oxides, silicon oxides, alkali, and alkaline earth compounds, etc. The present applicant has found that the purer the clinker the better will be its temperature resistance, and preferably that the impurities are present in concentrations less that 1%, the clinker will suffice as a useable aggregate. As used herein, the terms "CA6 clinker" and "CA6 aggregate" are interchangeable and equivalent and refer to the same form of material. A typical commercially available clinker or aggregate chemistry is shown here in Table 1 below:

TABLE 1

| Ingredient | Avg. Wt. % |
|---|---|
| $Al_2O_3$ | 90.0 |
| $SiO_2$ | 0.9 |
| $Fe_2O_3$ | <0.02 |
| CaO | 8.5 |
| Others Combined | <0.58 |

It will be appreciated by those skilled in the art that the commercially available clinkers available as set forth in Table 1 will vary from batch to batch and supplier to supplier due to raw material sourcing and other variations.

In the compositions of the CA6 clinker of the present invention, the presence of $C_{12}A_7$ is limited as a minor constituent such that compositions comprise $Al_2O_3$ contents >75% in reference to the aggregate or clinker. As used herein, the term "major" means at least about 50% or greater. As used herein, the term "minor" means less than about 50%. This does not include co-ground or blended materials whose chemistry can be controlled by addition of discrete diluents. This is important because $C_{12}A_7$ is a low melting phase that limits the maximum operating temperature of the product if present in substantial amounts. The application of the compositions of the present invention is limited to an operational temperature of up to but not including about 1830 degrees Centigrade. At this temperature liquid phases form in the pure system. It should be noted that the product will not be a pure system due to impurities present in the clinker.

The CA aggregate or clinker of the present invention may be a sinter product if porosity is desired or a fusion product if porosity is not desired (including partial fusions as a means of controlling porosity), or a dead burned product (i.e. fired immediately below the fusion point of the reactants).

Examples of industrial specific applications of the preset method are in black liquor boilers or gasifiers used in the paper industry, rotary lime kilns, cement kilns, and thermal oxidizers used for pesticides, which have a high level of inorganic salt moieties.

Ideal materials for this application show little or no reaction with molten or solubilized alkali or alkaline salts or compounds. CA6 is an effective chemical barrier to alkali and alkaline attack because the alumina is effectively bonded to the calcium and is not available for further reaction with other salt forming alkali or alkaline materials.

The method of this invention employs a composition based on CA6 as the primary mineral component for use in high alkali or alkaline environments. These environments may occur over a large temperature range from below room temperature (for example, from about −20 degrees Centigrade) to about a high temperature (for example at an elevated temperature, such as 1800 degrees Centigrade) where the material will behave as a refractory. Examples of the environments comprise a variety of alkali or alkaline salts either individually or in combination. Examples of these salts and compounds are potassium hydroxide, potassium carbonate, sodium hydroxide, sodium carbonate, lime, limestone, magnesium hydroxide, magnesium carbonate, potassium phosphate and sodium aluminate. These may be present in a solid state, a liquid state, or a gaseous state, all at a variety of temperature and pressures, depending on the melting point and other physical and chemical characteristics of the respective salt. Furthermore, the may be present in aqueous or non-aqueous solution.

An example of industrial processes where these environments occur and where this method of the present invention has utility is in lime recovery kilns. Lime recovery kilns are susceptible to alkali attack, in particular from sodium and/or potassium. Because the kiln operates at elevated temperatures these alkalis react with the lining to form glass phases. In particular, the silica in the lining can react with the alkali forming a low melting phase that easily wears or results in a densification that creates a differential thermal expansion within the lining resulting in a spall. By using CA6 as the major mineral phase in the lining (hence no added silica) these low melting glass phases will not form. Furthermore, the CaO-6Al2O3 or CA6 will not react with the alkali since the CA6 has a favorable delta Gibbs free energy compared to either the sodium or potassium aluminate compounds.

Another example of an industrial process is black liquor gasification that is used in the paper industry to recycle pulping or sizing compounds. In this process, the concentrated liquor which has very high levels of alkali and alkaline compounds is injected into the gasifier. The typical wastage mechanism or wear mechanism is due to formation of expansive sodium aluminate or other reaction products with increased volume, The expansion of the refractory results in fracturing and in some cases crumbling of the refractory surface. This expansion endangers the metallic gasifier vessel. The present invention provides a method of lining such a vessel employing a composition based on CA6 that is not susceptible to this type of chemical reaction. This method was evaluated by exposing a sample of a CA6 composition to molten salts typically found in the gasification process such as for example but not limited to potassium hydroxide or sodium hydroxide. The CA6 composition employed in the method of the present invention was exposed to molten salts typically found in the gasification process known by those skilled in the art. The CA6 composition was exposed to this environment of the gasifier for about 100 hours at either about 900 degrees Centigrade (C) or about 1000° C. A comparison of a CA6 composition to a mullite composition currently used for black liquor gasification is shown in FIG. 1.

FIG. 1 shows the CA6 composition employed in the method of the present invention on the right compared to a mullite based composition on the left. Both samples were tested in a molten alkali salt bath (at a temperature of about 1000° Centigrade) by Oak Ridge National Labs (ORNL) in Tennessee. The salt bath conditions that the samples were tested in were designed to simulate the conditions typical of those found in the black liquor environment of the paper manufacturing industry, as known by those skilled in the art. From FIG. 1, it can be seen that the method of the present invention employing the composition comprising the CA6 composition, that the CA6 composition's surface was resistant to dissolution while the mullite based composition was attacked as apparent by the eroded edges of the mullite sample.

Kilns used to roast magnesium hydroxide to MgO are another example of a high alkali/alkaline environment in which the method of the present invention may be employed. Several lower temperature processes will also benefit from this invention. Linings of these vessels are susceptible to attack in similar manners as described above.

Specifically, the method of the present invention is a method of lining a surface of a vessel or providing a surface that is lined with a composition as described herein. Preferably, the method of this invention employs a composition having a CA6 aggregate that is used as a lining or a barrier to safely contain alkali and/or alkaline process (caustic) which attack and destroy typical lining materials not based upon CA6. In another embodiment of this invention, the method employs the composition, as described herein, that is a lightweight CA6 aggregate. As used herein, the term "lightweight" means a material having a density less than 120 pounds per cubic foot.

The compositions employed in the present methods are formed into a three dimensional shape by a variety of processes known by those persons skilled in the art, such as for example, but not limited to, casting, slip casting, vibration casting, gel casting, and pressing, or forming within a die or mold. The compositions may be fired to a sufficient temperature, known by those skilled in the art, to cause bonding between the compositional ingredients. This is referred in the art as sintering, ceramic bonding, or direct bonding. The compositions employed in the method of the present invention are resistant to alkali and/or alkaline earth (caustic) environments at temperatures from about −20 degrees Centigrade to about 1800 degrees Centigrade, and preferably from about room temperature (about 28 to about 30 degrees Centigrade) to about up to, but not including, the melting point of the composition comprising CA6, such as for example a temperature generally about up to but not including 1830 degrees Centigrade. The compositions may comprise a bonding phase so that it is a castable or monolithic material. The compositions may be pressed into shape, such as for example but not limited to, a shape in the form of a brick. The compositions employed in the method of the present invention are resistant to basic (pH>7) environments, and preferably resistant to basic (pH>7) environments at elevated temperatures (from about above room temperature to about, but not including, 1830 degrees Centigrade).

In another embodiment of the method of the present invention, as described herein, the composition comprises a barium substitution for the calcium in the CA6 composition to form BA6, wherein B is BaO.

The present invention provides a method for improving the insulating character/and or penetration resistance of a liner in contact with at least one of an alkali and/or alkaline environments, comprising lining a surface that is subject to wear by an alkali environment and/or an alkaline environment with a refractory composition comprising a refractory aggregate consisting essentially of a calcium hexa aluminate clinker having the formula $CA_6$, wherein C is equal to calcium oxide, wherein A is equal to aluminum oxide, and wherein the hexa aluminate clinker has from zero to less than about fifty weight percent $C_{12}A_7$, and wherein greater than 98 weight percent of calcium hexa aluminate clinker having a particle size ranging from 325 mesh to +10 mesh, for forming a liner of the surface prior to contacting the surface with at least one of an alkali material, and an alkaline material, or combinations of the alkali and the alkaline materials, and for improving the insulating character/and or penetration resistance of the liner. In another embodiment of this invention, the method includes contacting the lined surface with at least one the alkali material, the alkaline material, or combinations thereof. Preferably, the method includes contacting the lined surface with at least one of the alkali material, the alkaline material, and combinations thereof, at temperatures ranging from about −20 degrees Centigrade to up to but not including about 1830 degrees Centigrade The method includes wherein the lined surface is resistant to chemical wear by the alkali material and/or the alkaline material.

In yet another embodiment of the present invention, the method includes wherein the surface is a vessel. The vessel is at least one of a boiler, a gasifier, a lime kiln, a cement kiln, a magnesium hydroxide roasting kiln, a thermal oxidizer, and a fluidized bed reactor. Preferably, the vessel is employed in the paper industry, and more preferably the vessel is a boiler, or a gasifier of the type employed in the paper industry. Most preferably, the vessel is employed in the processing of black liquor, such as for example but not limited to one or more of a boiler, a gasifier, and a fluidized bed reactor.

The method of the present invention includes wherein the refractory composition, as described herein, comprises one or more of the following of a calcium aluminate cement, a phenolic resin, a hydratable alumina, and an organic polymer as a binder, and combinations thereof.

The method of the present invention includes wherein the refractory composition, as described herein, comprises one or more of the following of an alumina, a MgO, a Mg(OH)$_2$, a spinel, a graphite, a zirconia, and a zirconia containing compound, and combinations thereof.

The method of the present invention includes wherein the refractory composition, as described herein, comprises one or more of the following of a fiber, an alumina, and a surfactant, and combinations thereof.

In yet another embodiment of the present invention, the method includes wherein the refractory composition, as described herein, comprises one or more sized fractions of the CA6 clinker, as described herein.

The method of the present invention, as described herein, includes wherein the lined surface functions as a refractory lining.

The method of the present invention, as described herein, includes wherein the lined surface functions as a chemical barrier that is substantially resistant to attack by at least one or more of the alkali material, alkaline material, and combinations thereof.

Another embodiment of the method of the present invention, as described herein, includes wherein the refractory composition, as described herein, is greater that about 50% by weight CA6 aggregate or clinker, and preferably is greater than about 70% by weight CA6 aggregate or clinker.

The following are examples of the compositions employed in the method of the present invention. As used herein, the CA6 aggregate is commercially available from Almatis, Inc., Pittsburgh, Pa., under the trade name "Bonite" or Almatis, Inc.'s lightweight (generally less than 120 pounds/cubic foot density) calcium aluminate aggregate commercially available under the trade name "SLA-92". Aluminas are commercially available from Almatis, Inc. under the trade names "RG-4000", or "A-2". Calcium aluminate cement bonding phases are commercially available from Almatis, Inc. under the trade names C"A-14" and "CA-25". "AR78" spinel is commercially available from Almatis, Inc. The alumina bonding phase is commercially available from Almatis, Inc. under the trade name "Alphabond". "T-153" fiber is a polypropylene fiber commercially available from Fibervisions, Covington, Ga. Bubble alumina and zirconia are commercially available from Washington Mills, Niagara Falls, N.Y. Dextrin is commercially available from Univar, Bunola, Pa. "Duramul ZR" composition and "Durazon CSB" composition are thermal shock inhibitors containing zirconia commercially available from Washington Mills, Niagara Falls, N.Y. Graphite may be flake or amorphous, and is commercially available from Asbury Graphite Mills Inc., Kittanning, Pa. The flake graphite preferably has a flake sizing ranging from about 50 micrometers to 800 micrometers in diameter and ranging from about 1 micrometer to about 150 micrometers in thickness. The phenolic resin binder may be any type of phenolic based polymer known by those skilled in the art such as for example those based upon phenol formaldehyde (novolak) or methyl formaldehyde type resin, or a resole phenol formaldehyde type resin. The phenolic resin binder is commercially available under the trade names "Bakelite PF 4109" and "Bakelite PF 6506" from Hexion Specialty Chemicals Inc., Columbus, Ohio. The organic polymer binder may be any type known by those skilled in the art such as for example but not limited to a polyvinylchloride polymer binder, a polyethylene polymer binder, a polypropylene polymer binder, and a polycarbonate polymer binder. Organic polymer binders are commercially available from 3M, St. Paul, Minn. The surfactant may be any suitable surfactant known by those skilled in the art, such as for example but not limited to, sodium tripolyphophate (STPP) that is commercially available from UNIVAR Pittsburgh, Bunola, Pa., or "Castament FS10" that is commercially available from BASF Construction Polymers, Kennesaw, Ga.

EXAMPLE 1

| | |
|---|---|
| CA6 aggregate (SLA-92) | 80% (wt.) |
| CA cement (CA-25) | 20% (wt.) |

EXAMPLE 2

| | |
|---|---|
| CA6 aggregate (Bonite) | 70% (wt.) |
| CA cement (CA-14) | 7% (wt.) |
| A-2 Alumina | 7% (wt.) |
| RG-4000 Alumina | 7% (wt.) |
| Zirconia | 9% (wt.) |

EXAMPLE 3

| | |
|---|---|
| CA6 aggregate (Bonite) | 70% (wt.) |
| CA cement (CA-14) | 5% (wt.) |
| A-2 Alumina | 5% (wt.) |
| RG-4000 Alumina | 5% (wt.) |
| Bubble Alumina | 15% (wt.) |

EXAMPLE 4

| | |
|---|---|
| CA6 aggregate (Bonite) | 93% (wt.) |
| A-2 Alumina | 5% (wt.) |
| Dextrin | 2% (wt.) |

EXAMPLE 5

| | |
|---|---|
| CA6 aggregate (Bonite) | 93% (wt.) |
| Flake Graphite | 5% (wt) |
| Phenolic resin binder | 2% (wt) |

EXAMPLE 6

| | |
|---|---|
| CA6 aggregate (Bonite) | 90% (wt.) |
| MgO or Mg(OH)$_2$ | 7% (wt) |
| Alphabond 300 | 3% (wt) |

EXAMPLE 7

| | |
|---|---|
| CA6 aggregate (Bonite) | 90% (wt.) |
| RG-4000 Alumina | 8% (wt) |
| Phenolic resin binder | 2% (wt) |

EXAMPLE 8

| | |
|---|---|
| CA6 aggregate (Bonite) | 90% (wt.) |
| AR78 spinel | 8% (wt) |
| Phenolic resin binder | 2% (wt) |

EXAMPLE 9

| | |
|---|---|
| CA6 aggregate (Bonite) | 90% (wt.) |
| RG-4000 Alumina | 8% (wt) |
| Organic polymer binder | 2% (wt) |

DETAILED COMPOSITIONAL STRATEGY, EXAMPLE 10

| | |
|---|---|
| CA6 Aggregate 3-6 mm* (Bonite) | 20% (wt.) |
| CA6 Aggregate 1-3 mm* (Bonite) | 15% (wt.) |
| CA6 Aggregate 0.5-1 mm* (Bonite) | 15% (wt.) |
| CA6 Aggregate 0-0.5 mm* (Bonite) | 20% (wt.) |
| CA6 Aggregate −45 u* (Bonite) | 17% (wt.) |
| CA6 Aggregate −20 u* (Bonite) | 5% (wt.) |
| RG-4000 Alumina | 5% (wt.) |
| Alphabond 300 | 3% (wt.) |
| T-153 fibers (plus addition) | 0.1% (wt.) |
| Surfactant** (plus addition) | 0.1% (wt.) |

*= average diameter of screen size
**"Castament FS10", BASF Construction Polymers.
u = microns

EXAMPLE 11

| | |
|---|---|
| CA6 aggregate (Bonite) | 70% (wt.) |
| CA cement (CA-14) | 5% (wt.) |
| A-2 Alumina | 5% (wt.) |
| RG-4000 Alumina | 5% (wt.) |
| Durazon CSB | 15% (wt.) |

EXAMPLE 12

| | |
|---|---|
| CA6 aggregate (Bonite) | 70% (wt.) |
| CA cement (CA-14) | 5% (wt.) |
| A-2 Alumina | 5% (wt.) |
| RG-4000 Alumina | 5% (wt.) |
| Duramul ZR | 15% (wt.) |

Examples 1-3 may be employed as castables utilizing calcium aluminate cement as a binder. Example 4 may be employed as a composition suitable for pressing into a shape with an addition of an effective amount of water determined by the green strength of the pressed shape (dependent on pressure exerted on material). As used herein, the term "effective amount" is that amount required to bring about a desired result. Example 5, 7 and 8 are compositions bonded by a phenolic resin. Example 9 is an example of an organic polymer bound composition suitable for lower temperature (i.e. temperatures less than about 290 degrees Centigrade) applications. Examples 6 and 10-12 are compositions bound by hydratable alumina. All examples, except Example 9, will benefit from high temperature (i.e. temperatures greater than about 1100 degrees Centigrade, and preferably ranging from about 1480 degrees Centigrade to about 1500 degrees Centigrade) firing to promote ceramic bonding, direct bonding, or sintering. Preferably, high temperature firing is applied to the composition of Example 4. While not being bound to any particular theory, it is believed that the composition of Example 9 does not benefit from high temperature firing because of the decomposition of the organic bond due to elevated temperatures. Examples 3 and 11 contain lightweight aggregates. Examples 2 and 12 contain thermal shock inhibitors. Example 5 contains graphite as a non-wetting agent. Examples 6 and 8 contain high temperature volume stabilizers in the form of in-situ spinel, and pre-formed spinel (reaction with temperature), respectively.

These examples are not intended to limit the scope of the present invention as described herein. These examples are for purposes of illustration and it will be evident to those persons skilled in the art that numerous variations and details of the instant invention may be made without departing from the instant invention as set forth herein.

We claim:
1. A method for manufacturing a black liquor gasifier liner comprising:
    lining a surface of a black liquor gasifier which operates in an aqueous environment that is subject to operating pressures of black liquor gasification and wear by an alkali environment and/or an alkaline environment with a refractory composition comprising greater than 70 percent by weight of a refractory aggregate consisting essentially of a calcium hexa aluminate clinker having the formula $CA_6$, wherein C is equal to calcium oxide, wherein A is equal to aluminum oxide, and wherein said hexa aluminate clinker has from zero to less than about fifty weight percent $C_{12}A_7$, and wherein greater than 98 weight percent of said calcium hexa aluminate clinker having a particle size ranging from −20 microns to +3 millimeters, for forming a liner of said surface prior to contacting said surface with at least one of an alkali material, and an alkaline material, or combinations of said alkali and said alkaline materials, and providing said liner wherein said refractory composition has a surface that is devoid of thermal expansive glass phases when contacted with said alkali and/or alkaline environments at temperatures below 1830° C.

2. The method of claim 1 including contacting said lined surface with at least one said alkali material, said alkaline material, or combinations thereof.

3. The method of claim 1 including wherein said lined surface is resistant to chemical wear by said alkali material and/or said alkaline material.

4. The method of claim 3 including contacting said lined surface with at least one of said alkali material, said alkaline material, and combinations thereof, at temperatures ranging from about −20 degrees Centigrade to up to but not including about 1830 degrees Centigrade.

5. The method of claim 1 including wherein said gasifier is a gasifier of the type employed in the paper industry.

6. The method of claim 1 including wherein said vessel is employed in the paper industry.

7. The method of claim 1 including wherein said refractory composition comprises a calcium aluminate cement.

8. The method of claim 1 including wherein said refractory composition comprises an alumina.

9. The method of claim 1 including wherein said refractory composition comprises a surfactant.

10. The method of claim 1 including wherein said refractory composition comprises one or more sized fractions of said CA6 clinker.

11. The method of claim 1 including wherein said lined surface functions as a refractory lining.

12. The method of claim 1 including wherein said lined surface functions as a chemical barrier that is substantially resistant to attack by at least one or more of said alkali material, alkaline material, and combinations thereof.

* * * * *